United States Patent
Berzinis et al.

(10) Patent No.: US 10,307,717 B2
(45) Date of Patent: Jun. 4, 2019

(54) POROUS MEMBRANES AND ASSOCIATED SEPARATION MODULES AND METHODS

(71) Applicant: SABIC Global Technologies B.V., Bergen op Zoom (NL)

(72) Inventors: Albin Peter Berzinis, Delmar, NY (US); Joris de Grooth, Enschede (NL); Johannes de Brouwer, Oisterwijk (NL); Miejuan Zhou, Selkirk, NY (US); Pooja Bajaj, Schenectady, NY (US); Rachel Elizabeth Halbfinger, Glenville, NY (US); Kristi Jean Narang, Selkirk, NY (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/356,836

(22) Filed: Nov. 21, 2016

(65) Prior Publication Data

US 2017/0282128 A1    Oct. 5, 2017

Related U.S. Application Data

(60) Provisional application No. 62/314,442, filed on Mar. 29, 2016.

(51) Int. Cl.
| | |
|---|---|
| *C08J 9/28* | (2006.01) |
| *B01D 61/14* | (2006.01) |
| *B01D 67/00* | (2006.01) |
| *B01D 71/52* | (2006.01) |
| *B01D 69/08* | (2006.01) |
| *B01D 71/26* | (2006.01) |
| *B01D 71/70* | (2006.01) |
| *B01D 71/80* | (2006.01) |

(52) U.S. Cl.
CPC ......... *B01D 69/088* (2013.01); *B01D 61/145* (2013.01); *B01D 67/0009* (2013.01); *B01D 67/0011* (2013.01); *B01D 67/0095* (2013.01); *B01D 69/08* (2013.01); *B01D 71/26* (2013.01); *B01D 71/52* (2013.01); *B01D 71/70* (2013.01); *B01D 71/80* (2013.01); *C08J 9/28* (2013.01); *B01D 2323/12* (2013.01); *B01D 2323/22* (2013.01); *B01D 2325/34* (2013.01); *B01D 2325/36* (2013.01); *B01D 2325/38* (2013.01); *C08J 2201/0544* (2013.01); *C08J 2207/00* (2013.01); *C08J 2371/12* (2013.01); *C08J 2471/02* (2013.01)

(58) Field of Classification Search
CPC ...... B01D 69/125; B01D 71/52; B01D 71/76; B01D 71/78; B01D 71/80; B01D 69/08; B01D 69/06; B01D 2325/022; B01D 2323/02; B01D 2325/36; B01D 2325/38
See application file for complete search history.

(56) References Cited

U.S. PATENT DOCUMENTS

| | | | |
|---|---|---|---|
| 3,446,856 A | 3/1969 | Hamilton | |
| 3,522,326 A | 7/1970 | Bostick et al. | |
| 3,703,564 A | 11/1972 | White | |
| 3,770,699 A | 11/1973 | White | |
| 3,970,640 A * | 7/1976 | Yonemitsu | C08G 65/44 528/212 |
| 4,201,880 A | 5/1980 | Van Sorge | |
| 4,277,344 A | 7/1981 | Cadotte | |
| 4,278,777 A | 7/1981 | Jakabhazy et al. | |
| 4,338,421 A * | 7/1982 | Maruyama | C08L 71/123 525/397 |
| 4,454,284 A | 6/1984 | Ueno et al. | |
| 4,622,206 A | 11/1986 | Torgeson | |
| 4,882,168 A * | 11/1989 | Casey | A61K 9/70 514/11.3 |
| 4,933,081 A | 6/1990 | Sasaki et al. | |

(Continued)

FOREIGN PATENT DOCUMENTS

| | | |
|---|---|---|
| CN | 103007787 A | 4/2013 |
| CN | 103170259 B | 12/2014 |

(Continued)

OTHER PUBLICATIONS

Asatekin et al.; "Anti-fouling ultrafiltration membranes containing polyacrylonitrile-graft-poly(ethylene oxide) comb copolymer additives"; Journal of Membrane Science 298 (2007) pp. 136-146.
ATRP Solutions; 2011 Catalog; 9 pages.
Baker; "Membranes and Modules"; Membrane Technology & Applications, Third Edition; 2012 John Wiley & Sons; pp. 97-178.
Bernardo et al.; "Membrane Gas Separation: A Review/State of the Art"; Ind. Eng. Chem. Res. 2009, 48, pp. 4638-4663.
Chung et al.; "Formation of ultrathin high-performance polyethersulfone hollow-fiber membranes"; Journal of Membrane Science 133 (1997) pp. 161-175.
Cooper et al.; "Preparation and Properties of Poly(arylene oxide) Copolymers"; Advances in Chemistry; American Chemical Society; 1973; Chap. 16, pp. 230-257.

(Continued)

*Primary Examiner* — Jeffrey C Mullis
(74) *Attorney, Agent, or Firm* — Cantor Colburn LLP

(57) ABSTRACT

A porous membrane is made from a poly(phenylene ether) copolymer containing 10 to 40 mole percent repeat units derived from 2-methyl-6-phenylphenol and 60 to 90 mole percent repeat units derived from 2,6-dimethylphenol; and a block copolymer containing backbone or pendant blocks of poly($C_{2-4}$ alkylene oxide). The porous membrane is made by dissolving the poly(phenylene ether) copolymer in a water-miscible polar aprotic solvent to form a membrane-forming composition; and phase-inverting the membrane forming-composition in a first non-solvent composition to form the porous membrane. A method of making a hollow fiber by coextrusion through a spinneret having an annulus and a bore, includes coextruding the membrane-forming composition through the annulus, and a first non-solvent composition through the bore, into a second non-solvent composition to form the hollow fiber.

18 Claims, 3 Drawing Sheets

(56) References Cited

U.S. PATENT DOCUMENTS

| | | | |
|---|---|---|---|
| 4,944,775 A | 7/1990 | Hayes | |
| 5,069,793 A | 12/1991 | Kaschemekat et al. | |
| 5,118,327 A | 6/1992 | Nelson et al. | |
| 5,128,421 A | 7/1992 | Ohmura et al. | |
| 5,132,363 A | 7/1992 | Furuta et al. | |
| 5,159,027 A | 10/1992 | Kanayama et al. | |
| 5,209,849 A | 5/1993 | Hu et al. | |
| 5,282,964 A | 2/1994 | Young et al. | |
| 5,385,976 A | 1/1995 | Furuta et al. | |
| 5,480,552 A | 1/1996 | Soltys et al. | |
| 5,527,467 A | 6/1996 | Oftshun et al. | |
| 5,643,968 A | 7/1997 | Andreola et al. | |
| 5,795,920 A | 8/1998 | Kang et al. | |
| 5,834,583 A | 11/1998 | Hancock et al. | |
| 6,294,499 B1 | 9/2001 | Watson et al. | |
| 6,437,084 B1 * | 8/2002 | Birsak | C08G 65/44 528/104 |
| 6,472,499 B1 | 10/2002 | Braat et al. | |
| 7,166,148 B2 | 1/2007 | Lyons et al. | |
| 7,208,438 B2 | 4/2007 | Ingelbrecht et al. | |
| 8,222,342 B2 | 7/2012 | Weber et al. | |
| 8,287,735 B2 | 10/2012 | Hanemaaijer et al. | |
| 8,302,781 B2 | 11/2012 | Wechs et al. | |
| 8,505,745 B2 | 8/2013 | Mayes et al. | |
| 8,602,221 B2 | 12/2013 | Mizomoto et al. | |
| 8,727,136 B2 | 5/2014 | Ansorge et al. | |
| 8,741,600 B2 | 6/2014 | Yamaguchi et al. | |
| 9,133,338 B2 | 9/2015 | Yang et al. | |
| 2004/0145127 A1 | 7/2004 | Pinto | |
| 2004/0149127 A1 | 8/2004 | Lyons et al. | |
| 2004/0231663 A1 | 11/2004 | Carter et al. | |
| 2005/0218057 A1 | 10/2005 | Ngee | |
| 2006/0076884 A1 | 4/2006 | Ahn | |
| 2006/0076885 A1 * | 4/2006 | Kim | B82Y 10/00 313/506 |
| 2006/0137522 A1 | 6/2006 | Nishimura et al. | |
| 2007/0068871 A1 | 3/2007 | Flynn | |
| 2007/0202374 A1 * | 8/2007 | Bridges | B01D 71/80 429/480 |
| 2007/0238832 A1 * | 10/2007 | Borade | C08J 3/226 525/66 |
| 2008/0076884 A1 | 3/2008 | Yeager et al. | |
| 2008/0076885 A1 * | 3/2008 | Yeager | C08G 65/44 525/534 |
| 2008/0085989 A1 | 4/2008 | Yeager et al. | |
| 2008/0142429 A1 | 6/2008 | Zhang et al. | |
| 2008/0203012 A1 | 8/2008 | Yeager et al. | |
| 2008/0207822 A1 | 8/2008 | Yeager et al. | |
| 2008/0312349 A1 | 12/2008 | Yeager et al. | |
| 2009/0018303 A1 * | 1/2009 | Onizuka | C08G 59/621 528/88 |
| 2010/0244306 A1 | 9/2010 | Tang | |
| 2012/0100904 A1 | 5/2012 | Morita et al. | |
| 2012/0277347 A1 * | 11/2012 | Bedner | B32B 27/04 523/451 |
| 2012/0305486 A1 | 12/2012 | Storr et al. | |
| 2013/0220924 A1 | 8/2013 | Maeda | |
| 2016/0008528 A1 | 1/2016 | Roy et al. | |
| 2016/0021191 A1 | 1/2016 | Wang et al. | |
| 2016/0022892 A1 | 1/2016 | Eifler et al. | |
| 2016/0079616 A1 | 3/2016 | Lee et al. | |
| 2017/0282131 A1 | 10/2017 | Berzinis et al. | |
| 2018/0079863 A1 * | 3/2018 | Ghanta | C08G 65/44 |

FOREIGN PATENT DOCUMENTS

| | | |
|---|---|---|
| EP | 0216633 | 4/1987 |
| EP | 0568045 A1 | 11/1993 |
| EP | 0083489 B1 | 4/1999 |
| EP | 1918019 A1 | 5/2008 |
| EP | 2535101 A1 | 12/2012 |
| JP | S42004276 B | 2/1964 |
| JP | S46002837 B | 10/1967 |
| JP | S46006542 | 12/1971 |
| JP | S60114323 A | 6/1985 |
| JP | S62057915 | 3/1987 |
| JP | S62071503 A | 4/1987 |
| JP | S62152507 A | 7/1987 |
| JP | S63100916 A | 5/1988 |
| JP | S63128021 A | 5/1988 |
| JP | S63197502 | 8/1988 |
| JP | S63218231 A | 9/1988 |
| JP | S63230173 A | 9/1988 |
| JP | H03065227 A | 3/1991 |
| JP | H04011927 | 1/1992 |
| JP | H08143699 A | 6/1996 |
| JP | S64030621 | 2/1999 |
| JP | H11156165 A | 6/1999 |
| JP | H11322921 A | 11/1999 |
| JP | 2000246064 A | 9/2000 |
| JP | 2004231743 A | 8/2004 |
| JP | 2005262211 A | 9/2005 |
| JP | 2013013838 A | 1/2013 |
| JP | 2014205761 A | 10/2014 |
| WO | 0240140 A1 | 5/2002 |
| WO | 03000389 A2 | 1/2003 |
| WO | 2004056459 A1 | 7/2004 |
| WO | 2005107929 A2 | 11/2005 |
| WO | 2008103599 A2 | 8/2008 |
| WO | 2012008837 A2 | 1/2012 |
| WO | 2013131848 A1 | 9/2013 |
| WO | 2014195234 A1 | 12/2014 |
| WO | 2015168392 A1 | 11/2015 |
| WO | 2015168409 A1 | 11/2015 |
| WO | 2015168414 A1 | 11/2015 |
| WO | 2015168423 A1 | 11/2015 |
| WO | 2015168584 A1 | 11/2015 |
| WO | 2015168592 A1 | 11/2015 |
| WO | 2015168418 A1 | 11/2016 |
| WO | 2016178835 A1 | 11/2016 |

OTHER PUBLICATIONS

Cooper et al.; "Preparation and Properties of Polyarylene Oxide Copolymers"; 1973; pp. 551-556.

Dongliang et al.; "Polyethersulfone hollow fiber gas separation membranes prepared from NMP/alcohol solvent systems"; Journal of Membrane Science; 115; 1996, pp. 85-108.

Kang et al.; "Protein antifouling mechanisms of PAN UF membranes incorporating Pan-g-PEO additive"; Journal of Membrane Science 296 (2007) pp. 42-50.

Kim et al.; "Ultrafiltration membranes prepared from blends of polyethersulfone and poly(1-vinylpyrrolidone-co-styrene) copolymers"; Journal of Membrane Science 262 (2005) pp. 60-68.

Liang et al.; "Synthesis and characterization of poly(phenylene oxide) graft copolymers by atom transfer radical polymerizations"; European Polymer Journal 45 (2009) pp. 2348-2357.

Petersen; "Composite reverse osmosis and nanofiltration membranes"; Journal of Membrane Science, 83 (1993) pp. 81-150.

Semsarzadeh et al.; "Synthesis and Characterization of Poly(phenylene oxide)-Based Block Copolymers via Cobalt Mediated Radical Polymerization (CMRP)"; Silicon; 6, 2014, pp. 27-34.

Smid et al.; "The formation of asymmetric hollow fibre membranes for gas separation, using PPE of different intrinsic viscosities"; Journal of Membrane Science, 64, 1991, pp. 121-128.

Ulbricht, "Advanced functional polymer membranes", Polymer; 47; Jan. 2006; pp. 2217-2262.

Vandezande et al.; "High throughput study of phase inversion parameters for polyimide-based SRNF membranes"; Journal of Membrane Science, 330, 2009, pp. 307-318.

Wang et al.; "Highly permeable polyethersulfone hollow fiber gas separation membranes prepared using water as non-solvent additive"; Journal of Membrane Science 176 (2000) pp. 147-158.

Wang et al.; "Polyethersulfone hollow fiber gas separation membranes prepared from NMP/alcohol solvent systems"; Journal of Membrane Science 115 (1996) pp. 85-108.

Yang et al.; "Tailoring pore size and pore size distribution of kidney dialysis hollow fiber membranes via dual-bath coagulation approach"; Journal of Membrane Science 290 (2007) pp. 153-163.

(56) References Cited

OTHER PUBLICATIONS

Yeager et al.; "Polyethers, Aromatic"; Encyclopedia of Polymer Science and Technology; vol. 11; John Wiley & Sons; pp. 64-87; No Date.
U.S. Appl. No. 15/303,562, filed Oct. 12, 2016, US2017/0021311, WO2015/168392.
U.S. Appl. No. 15/303,561, filed Oct. 12, 2016, US2017/0037177, WO2015/168409.
U.S. Appl. No. 15/303,556, filed Oct. 12, 2016, US2017/0043301, WO2015/168414.
U.S. Appl. No. 15/303,058, filed Oct. 10, 2016, US2017/0036169, WO2015/168418.
U.S. Appl. No. 15/303,061, filed Oct. 10, 2016, US2017/0043297, WO2015/168592.
U.S. Appl. No. 15/302,276, filed Oct. 6, 2016, US2017/0056835, WO2015/168423.
U.S. Appl. No. 15/302,323, filed Oct. 6, 2016, US2017/0021310, WO2015/168584.
U.S. Appl. No. 15/356,836, filed Nov. 21, 2016.
U.S. Appl. No. 15/356,854, filed Nov. 21, 2016.
U.S. Appl. No. 62/155,593, filed May 1, 2015, WO2016/178835.
CN 103170259; Machine Translation; Date of Publication: Dec. 10, 2014; 10 pages.
International Search Report for International Application No. PCT/US2016/028951; International Filing Date Apr. 22, 2016; dated Jul. 29, 2016; 7 pages.
International Search Report for International Application No. PCT/US2017/022061; Date of Filing: Mar. 13, 2017; dated Jul. 4, 2017; 6 pages.
International Search Report for International Application No. PCT/US2017/022088; Date of Filing: Mar. 13, 2017; dated Jun. 28, 2017; 6 pages.
JP S60114323; Machine Translation; Date of Publication: Jun. 20, 1985; 8 pages.
Loh et al.; "Fabrication of high performance polyethersulfone UF hollow fiber membranes using amphiphilic Pluronic block copolymers as pore-forming additives"; J. Membr. Sci., vol. 380; 2011; 114-123.
Non-Final Office Action dated Mar. 6, 2017; U.S. Appl. No. 15/356,854, filed Nov. 21, 2016; 28 pages.
Susanto et al.; "Characteristics, performance and stability of polyethersulfone ultrafiltration membranes prepared by phase separation method using different macromolecular additives"; J. Membr. Sci., vol. 327; 2009; p. 125-135.
U.S. Appl. No. 15/356,854 to Berzinis; filed Nov. 21, 2016; 38 pages.
U.S. Appl. No. 62/155,593 to Berzinis; filed May 1, 2015; 36 pages.
Written Opinion of the International Search Report for International Application No. PCT/US2016/028951; International Filing Date Apr. 22, 2016; dated Jul. 29, 2016; 9 pages.
Written Opinion of the International Searching Authority for International Application No. PCT/US2017/022061; Date of Filing: Mar. 13, 2017; dated Jul. 4, 2017; 9 pages.
Written Opinion of the International Searching Authority for International Application No. PCT/US2017/022088; Date of Filing: Mar. 13, 2017; dated Jun. 28, 2017; 8 pages.
JP 1999322921A; Machine Translation; Date of Publication: Nov. 26, 1999; 30 pages.
U.S. Notice of Allowance, U.S. Appl. No. 15/356,854, dated Aug. 16, 2017, 16 pages.
Written Opinion of the International Searching Authority of International Application No. PCT/US2016/028951; Date of Filing: Apr. 22, 2016; dated Apr. 11, 2017; 10 pages.
Non-Final Office Action for U.S. Appl. No. 15/303,562; dated Feb. 6, 2018.
International Preliminary Report on Patentability for International Application No. PCT/US2016/028951; Date of Filing: Apr. 22, 2016; dated Aug. 7, 2017; 9 pages.
Non Final Office Action for U.S. Appl. No. 15/303,561; dated Jul. 26, 2018; 16 pages.
Li et al., Ed., "Water Treatment and Water Quality Control of Power Station"; China Electric Power Press; 2012; pp. 203-204.
Li et al., Ed., "Water Treatment and Water Quality Control of Power Station"; China Electric Power Press; 2012; pp. 203-204 (Original in Chinese).
Non Final Office Action for U.S. Appl. No. 15/303,061; dated Jul. 19, 2018; 53 pages.
Non-Final Office Action for U.S. Appl. No. 15/302;276; dated Jul. 19, 2018; 45 pages.
Non-Final Office Action for U.S. Appl. No. 15/302,323; dated Jul. 19, 2018; 51 pages.
Non-Final Office Action for U.S. Appl. No. 15/303,058; dated Jul. 19, 2018; 56 pages.
Shi et al., Ed., "Membrane Technology Manual"; Chemical Industry Press; 2001; p. 199 (Original in Chinese).
Shi et al., Ed., "Membrane Technology Manual"; Chemical Industry Press; 2001; p. 199.
Wang, Ed. "Biomedical Engineering Principles"; Science Press; 1982; p. 326 (Original in Chinese).
Wang, Ed. "Biomedical Engineering Principles"; Science Press; 1982; p. 326.
Wang, Ed., "Membrane Separation Technology and Use Thereof"; Science Press; 1994; p. 181 (Original in Chinese).
Wang, Ed., "Membrane Separation Technology and Use Thereof"; Science Press; 1994; p. 181.
Zhong et al., Ed., "Principle of Chemical Industry"; National Defense Industry Press; 2013; p. 399 (Original in Chinese).
Zhong et al., Ed., "Principle of Chemical Industry"; National Defense Industry Press; 2013; p. 399.
Machine Translation for JPH08143699 obtained from Espacenet on Jan. 12, 2018, 10 pages;(https://worldwide.espacenet.com/publicationDetails/biblio?ll=0&ND=3&adjacent=true&locale=en_EP&FT=D&date=19960604&CC=JP&NR=H08143699A&KC=A#).
Machine Translation for JPS4665420A obtained from J-Plat Pat on Jan. 8, 2018, 14 pages;(https://www4.j-platpat.inpit.go.jp/cgi-bin/tran_web_cgi_ejje?u=http://www4.j-platpat.inpit.go.jp/eng/translation/20180424050647402376855621217410566C2CF07F06D8BF80DAC7BA11D51D95A0).
Machine Translation for JPS62152507A obtained from Espacenet on Jan. 12, 2018 , 11 pages ;(https://worldwide.espacenet.com/publicationDetails/biblio?ll=0&ND=3&adjacent=true&locale=en_EP&FT=D&date=19870707&CC=JP&NR=S62152507A&KC=A#).
Non-Final Office Action for U.S. Appl. No. 15/303,556; dated May 3, 2018; 30 pages.
Notice of Allowance for U.S. Appl. No. 15/303,562; dated Jun. 1, 2018; 25 pages.
Restriction Requirement for U.S. Appl. No. 15/302,323 dated Apr. 30, 2018; 8 pages.
Restriction Requirement for U.S. Appl. No. 15/303,058; dated May 1, 2018; 8 pages.
Restriction Requirement for U.S. Appl. No. 15/303,061; dated May 4, 2018; 8 pages.
Restriction Requirement for U.S. Appl. No. 15/303,561; dated Apr. 27, 2018; 10 pages.
Restriction Response for U.S. Appl. No. 15/302,276; dated Apr. 23, 2018: 8 pages.

\* cited by examiner

POROUS MEMBRANES AND ASSOCIATED SEPARATION MODULES AND METHODS

CROSS-REFERENCE TO RELATED APPLICATIONS

This application claims priority to U.S. Provisional Application No. 62/314,442, filed on Mar. 29, 2016, the entire contents of which are hereby incorporated by reference.

BACKGROUND

The preparation of porous membranes from resins such as polyarylsulfones (PSU) or polyarylethersulfones (PES) for applications in ultrafiltration is based on the Loeb-Sourirajan process where a polymer solution in N-methyl-2-pyrrolidone (NMP) is cast into a flat sheet or spun into a hollow fiber geometry and coagulated in water. The current processes for preparation of ultrafiltration membranes, especially those for demanding applications such as hemodialysis, also rely on incorporation of polymeric solution modifiers such as poly(vinyl pyrrolidone) (PVP) into the casting solution. The PVP is added at loadings of ~50% by weight of the membrane-forming polymer such as PES, but the majority of the PVP is transferred to the aqueous coagulation bath after coagulation of the PES. The PVP that is solubilized in the NMP/water coagulant stream must be separated and then discarded as a material loss. The presence of PVP also complicates separation and recycle of the NMP from the waste coagulant stream since it tends to decompose under the conditions required to distill the NMP. The PVP often remains in the surface pores of the coagulated membrane and post-treatment with aqueous baths containing sodium hypochlorite (NaOCl) is commonly required to remove unwanted excess PVP from the membrane.

The loss of PVP and added process steps significantly increase the cost and complexity of the processes used to prepare ultrafiltration membranes. Thus there is a need to identify a new material for use in ultrafiltration membranes which will form a nanoporous structure when cast from polar aprotic solvents such as NMP, which forms a self-wetting hydrophilic surface, and which does not leach substantial amounts of polymeric additives into the aqueous coagulant system.

BRIEF DESCRIPTION

A porous membrane comprises, consists essentially of, or consists of a poly(phenylene ether) copolymer comprising 10 to 40 mole percent repeat units derived from 2-methyl-6-phenylphenol and 60 to 90 mole percent repeat units derived from 2,6-dimethylphenol; and a block copolymer comprising backbone or pendant blocks of poly($C_{2-4}$ alkylene oxide).

A method of making the porous membrane comprises dissolving a poly(phenylene ether) copolymer comprising 10 to 40 mole percent repeat units derived from 2-methyl-6-phenylphenol and 60 to 90 mole percent repeat units derived from 2,6-dimethylphenol and a block copolymer comprising backbone or pendant blocks of poly($C_{2-4}$ alkylene oxide) in a water-miscible polar aprotic solvent to form a membrane-forming composition; and phase-inverting the membrane forming-composition in a first non-solvent composition to form the porous membrane.

A method of making a hollow fiber by coextrusion through a spinneret comprising an annulus and a bore, comprises coextruding: a membrane-forming composition comprising a poly(phenylene ether) copolymer comprising 10 to 40 mole percent repeat units derived from 2-methyl-6-phenylphenol and 60 to 90 mole percent repeat units derived from 2,6-dimethylphenol, and a block copolymer comprising backbone or pendant blocks of poly($C_{2-4}$ alkylene oxide) dissolved in a water-miscible polar aprotic solvent, through the annulus, and a first non-solvent composition comprising water, a water-miscible polar aprotic solvent, or a combination comprising at least one of the foregoing, in the first non-solvent composition, through the bore, into a second non-solvent composition comprising water, a water-miscible polar aprotic solvent, or a combination comprising at least one of the foregoing, to form the hollow fiber.

BRIEF DESCRIPTION OF THE DRAWINGS

Referring now to the drawings.

DETAILED DESCRIPTION

Figure 1:
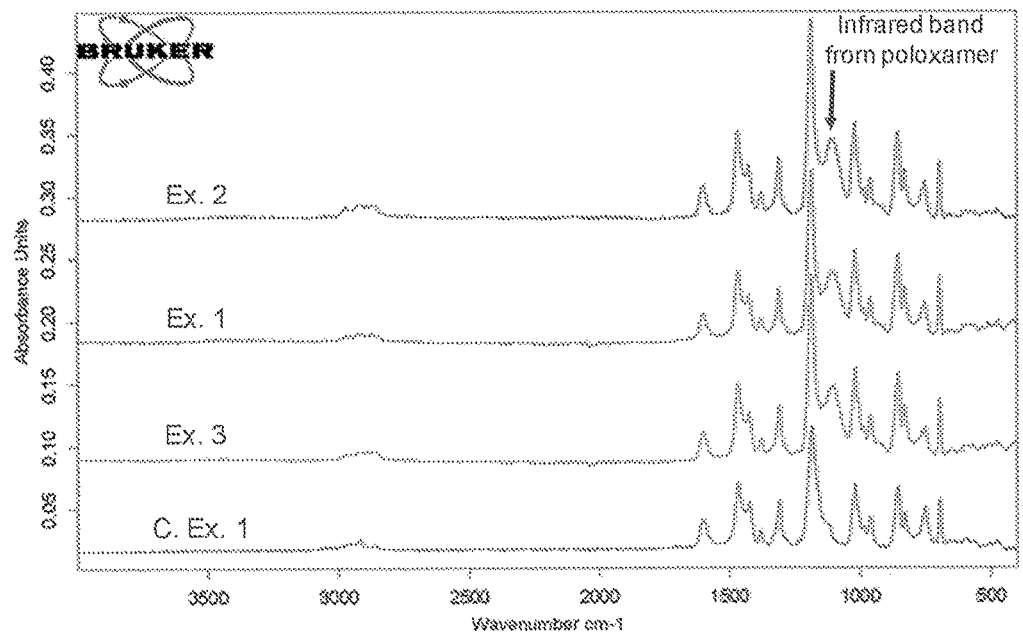
FIG. 1 depicts Fourier Transform Infrared (FTIR) Attenuated Total Reflectance (ATR) spectra of dense membranes of Examples 5-7, composed of 20/80 MPP-DMP copolymer and poloxamers cast from $CHCl_3$.

The inventors hereof have discovered specific hydrophilic block copolymers that are particularly effective in combination with hydrophobic polymers comprising poly(phenylene ether) or poly(phenylene ether) copolymer for the manufacture of porous membranes, including hollow fibers, for use in ultrafiltration. Advantageously, use of the block copolymer in combination with a hydrophobic polymer comprising a poly(phenylene ether) or poly(phenylene ether) copolymer provides porous membranes having surface pore size distributions, surface pore densities, and water contact angles that make them suitable for use in separation modules for purification of aqueous streams by ultrafiltration. The block copolymer provides a hydrophilic surface to porous membranes fabricated from hydrophobic polymers comprising a poly(phenylene ether) or poly(phenylene ether) copolymer, and yet has an affinity for the poly (phenylene ether) or poly(phenylene ether) copolymer, so that the block copolymer is not extracted by washing during fabrication or in end-use operation of the porous membrane during ultrafiltration. Advantageously, the use of the block copolymer in combination with poly(phenylene ether) or poly(phenylene ether) copolymer provides ultrafiltration membranes having a nanoporous structure when cast from polar aprotic solvents such as N-methyl-2-pyrrolidone, and provides a self-wetting hydrophilic surface for the porous membrane. Moreover, the block copolymer is not leached into the aqueous coagulant or aqueous washes during fabrication, or into aqueous streams during ultrafiltration.

The porous membrane comprises, consists essentially of, or consists of a poly(phenylene ether) copolymer comprising 10 to 40 mole percent repeat units derived from 2-methyl-6-phenylphenol and 60 to 90 mole percent repeat units derived from 2,6-dimethylphenol; and a block copolymer comprising backbone or pendant blocks of poly($C_{2-4}$ alkylene oxide).

The poly(phenylene ether) copolymer comprises a poly(2-methyl-6-phenyl-1,4-phenylene ether-co-2,6-dimethyl-1,4-phenylene) copolymer having 10 to 40 mole percent of repeat units derived from 2-methyl-6-phenylphenol and 60 to 90 mole percent repeat units derived from 2,6-dimethylphenol. Within this range, the poly(phenylene ether) copolymer can comprise greater than or equal to 12.5, 15, or 20 mole percent and less than or equal to 35, 30, or 25 mole percent 2-methyl-6-phenylphenol, and greater than or equal to 35, 40, or 45 mole percent and less than or equal to 80 or 85 mole percent 2,6-dimethylphenol. The inventors have discovered the criticality of the amount of 2-methyl-6-phenylphenol (MPP) comonomer. Below about 10 mole percent 2-methyl-6-phenylphenol, the copolymer does not have sufficient solubility in the dope solution used to prepare the porous membrane. Above about 40 mole percent 2-methyl-6-phenylphenol, it can be difficult to incorporate that much 2-methyl-6-phenylphenol into the copolymer due to its lower reactivity relative to 2,6-dimethylphenol; the viscosity of the dope solution at suitable copolymer concentrations can be too low to produce porous membranes; and the copolymer can be too costly. In the range of about 10 to 40 mole percent 2-methyl-6-phenylphenol, solubility, viscosity, and cost of the copolymer, and incorporation of the 2-methyl-6-phenylphenol is optimized.

The hydrophobic polymer can be a poly(phenylene ether) copolymer having an intrinsic viscosity of 0.6 to 1.5 deciliters per gram, measured in chloroform at 25° C. using an Ubbelohde viscometer. Within this range, the intrinsic viscosity can be greater than or equal to 0.7, 0.8, 0.9, 1.0, or 1.1 deciliters per gram, and less than or equal to 1.4, or 1.3 deciliters per gram. In some embodiments, the intrinsic viscosity is 0.7 to 1.1 deciliters per gram, or 0.7 to 0.9 deciliters per gram. The poly(phenylene ether) copolymer can also have a weight average molecular weight of 75,000 to 500,000 daltons (Da), as measured by gel permeation chromatography against polystyrene standards. Within this range, the weight average molecular weight can be greater than or equal to 100,000 or 200,000 Da and less than or equal to 400,000, 350,000, or 300,000 Da. In some embodiments, the weight average molecular weight is 75,000 to 200,000 Da, specifically 100,000 to 150,000 Da. The poly(phenylene ether) copolymer can have a polydispersity (ratio of weight average molecular weight to number average molecular weight of 2 to 12. Within this range, the polydispersity can be greater than or equal to 3 or 4 and less than or equal to 10, 9, or 8. In some embodiments, the poly(phenylene ether) copolymer has an intrinsic viscosity of 0.6 to 1.5 deciliters per gram, measured in chloroform at 25° C. and a weight average molecular weight of 75,000 to 500,000 daltons, measured by gel permeation chromatography against polystyrene standards.

The solubility of the poly(phenylene ether) copolymer in a water-miscible polar aprotic solvent can be greater than or equal to 50 grams per kilogram at 25° C., based on the combined weight of the hydrophobic polymer and the solvent. Within this range, the solubility can be greater than or equal to 100, 120, 140, or 160 grams per kilogram, and less than or equal to 400, 300, 250, 200, or 180 grams per kilogram at 25° C. The polar aprotic solvent can be, for example N-methyl-2-pyrollidone, N,N-dimethylformamide, or N,N-dimethylacetamide. Advantageously, the use poly(phenylene ether) copolymers having an intrinsic viscosity of 0.6 to 1.5 deciliters per gram, specifically 0.7 to 1.1 deciliters per gram or 0.7 to 0.9 deciliters per gram, and a solubility of 50 to 400 grams per kilogram at 25° C. results in membrane-forming compositions with solution concentrations and viscosities that provide good control over the phase inversion step of membrane formation.

The porous membrane comprises a block copolymer comprising backbone or pendant blocks of poly($C_{2-4}$ alkylene oxide). In some embodiments, the poly($C_{2-4}$ alkylene oxide) blocks are derived from copolymerization of ethylene oxide, propylene oxide, 1,2-butylene oxide, or a combination comprising at least one of the foregoing. In some embodiments, the block copolymer is poly(propylene oxide), poly(ethylene oxide)-poly(propylene oxide)-poly(ethylene oxide) block copolymer, a poly(ethylene oxide)-poly(propylene oxide)-poly(ethylene oxide) block copolymer, a poly($C_{2-4}$ alkylene oxide)-poly(dimethylsiloxane) block copolymer, or a combination comprising at least one of the foregoing.

In some embodiments, the porous membrane comprises 20 to 90 weight percent poly(phenylene ether) copolymer and 10 to 80 weight percent block copolymer, based on the total weight of the porous membrane. Within this range, the porous membrane can comprise greater than or equal to 30, 40, 50 or 60 weight percent and less than or equal to 80 or 70 weight percent, poly(phenylene ether) copolymer, and greater than or equal to 20, 30, 40, 50 or 60 weight percent and less than or equal 70 weight percent, of the block copolymer. In some embodiments, the porous membrane comprises 60 to 90 weight percent poly(phenylene ether) copolymer and 10 to 40 weight percent block copolymer; or 60 to 80 weight percent poly(phenylene ether) copolymer, and 20 to 40 weight percent block copolymer. The inventors have discovered that the amount of block copolymer in the porous membrane can affect the porous membrane properties. For example, when the poly(phenylene ether) copolymer is derived from 20 mole percent 2-methyl-6-phenylphenol and 80 mole percent 2,6-dimethylphenol, and the block copolymer is poly(ethylene oxide)-poly(propylene oxide)-poly(ethylene oxide) having 30 weight percent polypropylene oxide blocks, and a number average molecular weight of 5,000 Da, greater than about 40 weight percent of the block copolymer is required to obtain a self-wetting porous membrane.

In some embodiments, the block copolymer comprises a poloxamer. A poloxamer is a poly(ethylene oxide)-poly(propylene oxide)-poly(ethylene oxide) block copolymer or a poly(propylene oxide)-poly(ethylene oxide)-poly(propylene oxide) block copolymer. In some embodiments, the block copolymer comprises a poly(ethylene oxide)-poly(propylene oxide)-poly(ethylene oxide) block copolymer having a number average molecular weight of 1,000 to 14,000 daltons. Within this range, the block copolymer can have a number average molecular weight greater than or equal to 2,000 daltons and less than or equal to 12,000, 10,000, 8,000, 6,000, or 4,000 daltons, specifically 2,000 to 6,000 daltons. The poly(ethylene oxide)-poly(propylene oxide)-poly(ethylene oxide) block copolymer can also comprise, based on the weight of the block copolymer, 1 to 90 weight percent poly(ethylene oxide) blocks. Within this range, the block copolymer can comprise greater than or equal to 5 weight percent and less than or equal to 80, 50, 40, or 30 weight percent, specifically 5 to 50 weight percent, of poly(ethylene oxide) blocks.

In some embodiments, the block copolymer comprises a poly(propylene oxide)-poly(ethylene oxide)-poly(propylene oxide) block copolymer having a number average molecular weight of 500 to 12,000 daltons. Within this range, the block copolymer can have a number average molecular weight of greater than or equal to 1,000, or 2,000 daltons and less than or equal to 10,000, 8,000, or 6,000 daltons, specifically 2,000 to 10,000 daltons. The poly(propylene oxide)-poly(ethylene oxide)-poly(propylene oxide) block copolymer can also comprise, based on the weight of the block copolymer, 1 to 90 weight percent of poly(ethylene oxide) blocks. Within this range, the block copolymer can comprise greater than or equal to 5 weight percent and less than or equal to 80, 50, 40, or 30 weight percent, specifically 5 to 50 weight percent, of poly(ethylene oxide) blocks. In some embodiments, the block copolymer comprises a combination of the poly(propylene oxide)-poly(ethylene oxide)-poly(propylene oxide) block copolymer and poly(propylene oxide)-poly(ethylene oxide)-poly(propylene oxide) block copolymer described herein.

Poloxamers are available from BASF under the PLURONIC™ trade name and from Croda under the SYNPERONIC™ trade name. Some commercial examples are listed in Table 1 below.

TABLE 1

Commercially Available Poloxamers

| Trade Name | $M_n$ (Da) | Structure | PEO Content (wt. %) |
|---|---|---|---|
| PLURONIC ™ 31R1 | 3,300 | (II) x + z = 52, y = 8; x = z = 26[a] | 10 |
| PLURONIC ™ L81 | 2,800 | (I) x + z = 6, y = 44; x = z = 3[a] | 10 |
| PLURONIC ™ P123 | 5,800 | (I) x + z = 40, y = 70; x = z = 20[a] | 30 |
| SYNPERONIC ™ L62 | 2,250 | (I) | 20 |
| SYNPERONIC ™ L64 | 3,000 | (I) | 40 |
| SYNPERONIC ™ L101 | 3,300 | (I) | 10 |
| PLURONIC ™ 17R2 | 2,200 | (II) | 20 |
| PLURONIC ™ 17R4 | 2,800 | (II) | 40 |

[a]Most prevalent polymer.

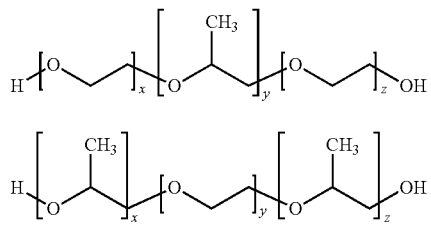

In some embodiments, the block copolymer comprises a poly($C_{2-4}$ alkylene oxide)-polysiloxane block copolymer comprising, based on the total weight of the block copolymer, 5 to 60 weight percent polysiloxane. Within this range, the poly($C_{2-4}$ alkylene oxide)-polysiloxane block copolymer can comprise greater than or equal to 10, 15, or 20 weight percent and less than or equal to 50 or 40 weight percent, specifically 20 to 40 weight percent, polysiloxane. The poly($C_{2-4}$ alkylene oxide)-polysiloxane block copolymer can also have a number average molecular weight of 500 to 14,000 daltons. Within this range, the number average molecular weight can be greater than or equal to 1000 or 2000 daltons and less than or equal to 12,000, 10,000, 8,000 or 6,000 daltons, specifically 1,000 to 6,000 daltons.

The poly($C_{2-4}$ alkylene oxide)-polysiloxane block copolymer can have the structure:

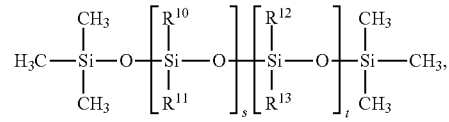

wherein $R^{10}$, $R^{11}$, $R^{12}$, and $R^{13}$ are each independently a $C_{1-12}$ alkyl, aryl, alkaryl, aralkyl, alkoxy, substituted alkyl, substituted aryl, or Q, provided that at least one of $R^{11}$, $R^{12}$, and $R^{13}$ is Q, and s and t are each independently an integer from 1 to 50; and wherein Q has the structure:

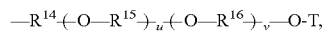

wherein $R^{14}$ is a $C_1$-$C_{10}$ alkylene; $R^{15}$ and $R^{16}$ are each independently $C_{2-4}$ alkylene; T is hydrogen, methyl, butyl, or acetyl; and u and v are each independently integers from 1 to 20.

In some embodiments, the block copolymer comprises a poly($C_{2-4}$ alkylene oxide)-poly(dimethylsiloxane) block copolymer of structure:

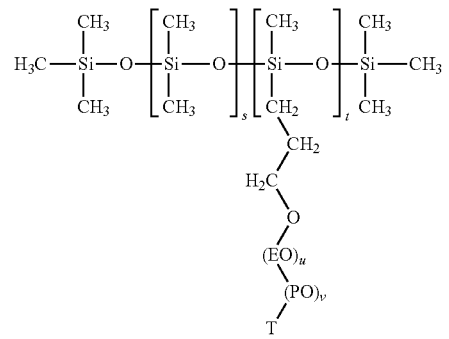

wherein: EO is —$CH_2$—$CH_2$—O—; PO is —$CH_2$—CH($CH_3$)—O—; T is hydrogen, methyl, butyl, or acetyl; s and t are each independently an integer from 1 to 50; u is an integer from 1 to 20; and v is an integer from 0 to 20.

The porous membrane can have a uniform distribution of pores throughout its thickness, i.e. it can have a uniform density along a cross-section. The porous membrane can also have a non-uniform distribution of pores throughout its thickness, i.e. it can have a non-uniform density along its thickness. For example, the membrane can be a porous asymmetric membrane, i.e. it can have a gradation of pore size from large to small along a cross-section.

The porous membrane comprising a poly(phenylene ether) or poly(phenylene ether) copolymer, and a block copolymer comprising backbone or pendant blocks of poly(alkylene oxide), exhibits many advantageous surface properties. The block copolymer comprising backbone or pendant poly(alkylene oxide) is incorporated into the selective surface layer of the porous membrane by the method, which advantageously reduces the water contact angle of the surface compared to a porous membrane made from the hydrophobic polymer without the block copolymer. The lower the water contact angle of the porous membrane, the more likely the membrane will be self-wetting. For example, the porous membrane can have a water contact angle of greater than or equal to 20, 30, or 40 degrees, and less than or equal to 80, 70, or 60 degrees. In some embodiments, the porous membrane has a water contact angle of 20 to 80 degrees. The porous membrane made by the method can have a mean surface pore size distribution on the selective layer of greater than or equal to 1, 5, 10 nanometers (nm) and less than or equal to 100, 50, or 20 nm±1, 2, 5, or 10 nm. The porous membrane made by the method can also have a surface pore density of greater than or equal to 100, 200, or 400 pores per $\mu m^2$ and less than or equal to 4,000, 2,400, or 1,200 pores per $\mu m^2$.

A method of forming the porous membrane, comprises: dissolving a poly(phenylene ether) copolymer comprising 10 to 40 mole percent repeat units derived from 2-methyl-6-phenylphenol and 60 to 90 mole percent repeat units derived from 2,6-dimethylphenol and, a block copolymer comprising backbone or pendant blocks of poly($C_{2-4}$ alkylene oxide) in a water-miscible polar aprotic solvent to form a porous membrane-forming composition; and phase-inverting the porous membrane forming-composition in a first non-solvent composition to form the membrane. All of the properties of the porous membrane disclosed herein apply as well to the method of making the porous membrane. For example, the method of forming the porous membrane can comprise: dissolving a hydrophobic polymer comprising, consisting essentially of, or consisting of a poly(phenylene ether) copolymer comprising 50 to 90 mole percent repeat units derived from 2,6-dimethylphenol; and 10 to 50 mole percent repeat units derived from 2-methyl-6-phenylphenol; and a block copolymer, wherein the block copolymer is a poly(ethylene oxide)-poly(propylene oxide)-poly(ethylene oxide) block copolymer, a poly(ethylene oxide)-poly(propylene oxide)-poly(ethylene oxide) block copolymer, a poly($C_{2-4}$ alkylene oxide)-poly(dimethylsiloxane) block copolymer, or a combination comprising at least one of the foregoing, in N-methyl-2-pyrrolidone to form a porous membrane-forming composition; and phase-inverting the porous membrane forming-composition in a first non-solvent composition comprising water, N-methyl-2-pyrrolidone, or a combination comprising at least one of the foregoing, to form the porous membrane.

In some embodiments, the membrane-forming composition comprises, based on the total weight of the composition, 1 to 50 weight percent, specifically 10 to 40 weight percent, of the poly(phenylene ether) copolymer and block copolymer comprising backbone or pendant blocks of poly($C_{2-4}$ alkylene oxide) combined, and 50 to 99 weight percent, specifically 60 to 90 weight percent, of the water-miscible polar aprotic solvent, and has a viscosity of 1 to 100 pascal·seconds, specifically 1 to 20 pascal·seconds. In some embodiments of the method, the block copolymer comprising backbone or pendant blocks of poly($C_{2-4}$ alkylene oxide) is dissolved in the first non-solvent composition instead of the membrane-forming composition.

The poly(phenylene ether) copolymer is dissolved in a water-miscible polar aprotic solvent to form the membrane-forming composition. The water-miscible polar aprotic solvent can be, for example, N,N-dimethylformamide (DMF), N,N-dimethylacetamide (DMAC), N-methyl-2-pyrrolidone (NMP), N-ethyl-2-pyrrolidone, dimethyl sulfoxide (DMSO), dimethyl sulfone, sulfolane, butyrolactone; and combinations comprising at least one of the foregoing. In some embodiments, the water-miscible polar aprotic solvent is N-methyl-2-pyrrolidone. The solubility of the poly(phenylene ether) copolymer in the water-miscible polar aprotic solvent can be greater than 50 grams per kilogram at 25° C., based on the combined weight of the poly(phenylene ether) and the solvent. Within this range, the solubility can be greater than or equal to 100, 120, 140, or 160 grams per kilogram, and less than or equal to 400, 300, 250, 200, or 180 grams per kilogram at 25° C. Solubility can be determined in N-methyl-2-pyrollidone, N,N-dimethylformamide, or N,N-dimethylacetamide. Advantageously, a poly(phenylene ether) copolymer solubility of 50 to 400 grams per kilogram provides membrane-forming compositions conducive to the formation of suitable porous membranes. The membrane-forming composition can also comprise a polar protic co-solvent, for example glycerin, isopropanol, or water, to modify viscosity and cloud point of the membrane-forming composition, and thereby modify the pore structures of porous membranes made from the membrane-forming compositions.

The first non-solvent composition comprises water, a water-miscible polar aprotic solvent, or a combination comprising at least one of the foregoing. The water-miscible polar aprotic solvent can be any of the water-miscible polar aprotic solvents used for the membrane-forming composition. In some embodiments, the first non-solvent composition comprises, based on the total weight of the first non-solvent composition, 10 to 100 weight percent water and 0 to 90 weight percent N-methyl-2-pyrrolidone. Within this range, the first non-solvent composition can comprise 10 to 90 weight percent, specifically 10 to 80 weight percent, water and 10 to 90 weight percent, specifically 20 to 90 weight percent, N-methyl-2-pyrrolidone. In some embodiments, the first non-solvent composition comprises about 75 weight percent water and about 25 weight percent N-methyl-2-pyrrolidone. The first non-solvent composition serves as a coagulation, or phase inversion, bath for the membrane-forming composition. The porous membrane is formed by contacting the membrane-forming composition with the first non-solvent composition. The hydrophobic polymer, which is near its gel point in the membrane-forming composition, coagulates, or precipitates as a porous film or hollow fiber, depending on the method used. As mentioned above, in some embodiments of the method, the block copolymer comprising backbone or pendant blocks of poly(alkylene oxide) is dissolved in the first non-solvent composition instead of the membrane-forming composition.

The method includes phase-inverting the membrane-forming composition in the first non-solvent composition. Any of several techniques for phase inversion can be used. For example, the phase inversion can be a dry-phase separation method in which the dissolved copolymer is precipitated by evaporation of a sufficient amount of solvent mixture to form the membrane. The phase inversion step can also be a wet-phase separation method in which the dissolved copolymer is precipitated by immersion in the first non-solvent to form the membrane. The phase inversion step can be a dry-wet phase separation method, which is a combination of the dry-phase and the wet-phase methods. The phase inversion step can be a thermally-induced separation method in which the dissolved copolymer is precipitated or coagulated by controlled cooling to form the membrane. The porous membrane, once formed, can be subjected to membrane conditioning or pretreatment, prior to its end-use. The conditioning or pretreatment can be thermal annealing to relieve stresses, and/or wetting and pre-equilibration of the porous membrane in the expected feed stream.

In some embodiments, the method further comprises washing the porous membrane in a second non-solvent composition. This washing step can be repeated one or more times. The number of washing steps should be sufficient to rinse any residual block copolymer comprising backbone or pendant blocks of poly(alkylene oxide) not adhered to the porous membrane, and any residual water-miscible polar aprotic solvent, from the porous membrane. The first and second non-solvent compositions can be the same or different, and can comprise water, or a mixture of water and a water-miscible polar aprotic solvent. In some embodiments, the first and second non-solvent compositions are independently selected from water, and a mixture of water and N-methyl-2-pyrrolidone. In some embodiments, the first and second non-solvent compositions are both water. The water can be deionized. In some embodiments, the method further comprises drying the porous membrane to remove residual first and second non-solvent composition, for example water and N-methyl-2-pyrrolidone.

The method is also applicable to making hollow fibers by coextrusion of a dope solution and a bore fluid, in which the membrane-forming composition is the dope solution and the first non-solvent composition is the bore fluid. Thus in some embodiments, a method of making a hollow fiber by coextrusion through a spinneret comprising an annulus and a bore, comprises coextruding a membrane-forming composition comprising a poly(phenylene ether) copolymer comprising 10 to 40 mole percent repeat units derived from 2-methyl-6-phenylphenol and 60 to 90 mole percent repeat units derived from 2,6-dimethylphenol, and a block copolymer comprising backbone or pendant blocks of poly($C_{2-4}$ alkylene oxide) dissolved in a water-miscible polar aprotic solvent through the annulus, and a first non-solvent composition comprising water, a water-miscible polar aprotic solvent, or a combination comprising at least one of the foregoing, through the bore, into a second non-solvent composition comprising water, a water-miscible polar aprotic solvent, or a combination comprising at least one of the foregoing, to form the hollow fiber. In some embodiments of the method, the block copolymer comprising backbone or pendant blocks of poly($C_{2-4}$ alkylene oxide) is dissolved in the first non-solvent composition (bore fluid) instead of the membrane-forming composition (dope solution).

In some embodiments the method further comprises washing the hollow fiber in a third non-solvent composition. This washing step can be repeated one or more times. These steps serve to rinse any residual water-miscible polar aprotic solvent from the hollow fibers. The second and third non-solvent compositions can be the same or different, and can comprise water, or a mixture of water and a water-miscible polar aprotic solvent. In some embodiments the second and third non-solvent compositions are independently selected from water, and a mixture of water and N-methyl-2-pyrrolidone. In some embodiments, the second and third non-solvent compositions are each water. The water can be deionized. In some embodiments, the method further comprises drying the hollow fiber to remove residual second and third non-solvent composition, for example water and N-methyl-2-pyrrolidone.

A hollow fiber is made by coextruding through a spinneret comprising an annulus and a bore: a membrane-forming composition comprising a poly(phenylene ether) copolymer comprising 10 to 40 mole percent repeat units derived from 2-methyl-6-phenylphenol and 60 to 90 mole percent repeat units derived from 2,6-dimethylphenol and a block copolymer comprising backbone or pendant blocks of poly($C_{2-4}$ alkylene oxide), dissolved in a water-miscible polar aprotic solvent through the annulus, and a first non-solvent composition comprising water, a water-miscible polar aprotic solvent, or a combination comprising at least one of the foregoing, through the bore, into a second non-solvent composition comprising water, a water-miscible polar aprotic solvent, or a combination comprising at least one of the foregoing, to form the hollow fiber.

The hollow fibers can be used in various separation modules. Thus in some embodiments, a separation module comprises hollow fiber made by coextruding through a spinneret comprising an annulus and a bore: a membrane-forming composition comprising poly(phenylene ether) copolymer comprising 10 to 40 mole percent repeat units derived from 2-methyl-6-phenylphenol and 60 to 90 mole percent repeat units derived from 2,6-dimethylphenol and a block copolymer comprising backbone or pendant blocks of poly($C_{2-4}$ alkylene oxide) through the annulus, and a first non-solvent composition comprising water, a water-miscible polar aprotic solvent, or a combination comprising at least one of the foregoing, and a polymer additive dissolved in the first non-solvent composition, through the bore, into a second non-solvent composition comprising water, a water-miscible polar aprotic solvent, or a combination comprising at least one of the foregoing, to form the hollow fiber.

The configuration of the porous membrane made by the method can be sheet, disc, spiral wound, plate and frame, hollow fiber, capillary, or tubular. Outside-in and inside-out separations are applicable to hollow fiber membranes, capillary membranes, and tubular membranes, each having an inner and outer surface in contact with the feed and retentate or the permeate.

The porous membrane made by the method can be a hollow fiber. The wall thickness of the hollow fiber can be 10 to 200 micrometers. Within this range, the diameter can greater than 20 and less than or equal to 80, 60, 40, or 35 micrometers. In another embodiment the diameter can be 50 to 5000 micrometers (μm), specifically 100 to 2000 μm. The membrane can comprise a substantially non-porous surface layer, and the non-porous surface layer can be on the inside surface of the hollow fiber. A separation module can comprise bundles of porous hollow fibers. In some embodiments, the fiber bundle comprises 10 to 10,000 porous hollow fibers. The hollow fibers can be bundled longitudinally, potted in a curable resin on both ends, and encased in a pressure vessel to form the hollow fiber module. Hollow fiber modules can be mounted vertically or horizontally.

The porous membranes can be fabricated into separation modules designed for purification of various aqueous, non-aqueous (e.g., hydrocarbon), or gaseous streams. Thus in some embodiments, a separation module comprises the porous membrane comprising a poly(phenylene ether) copolymer comprising 10 to 40 mole percent repeat units derived from 2-methyl-6-phenylphenol and 60 to 90 mole percent repeat units derived from 2,6-dimethylphenol and a block copolymer comprising backbone or pendant blocks of poly($C_{2-4}$ alkylene oxide). The separation module can be designed for dead-end separation, cross-flow separation, inside-out separation, or outside-in separation.

Depending upon porous membrane surface pore size distribution and pore density, and the end-use, the separation module fabricated from the porous membrane made by the method can be a media filtration module, a microfiltration module, an ultrafiltration module, a nanofiltration module, or a reverse osmosis module. The separation module fabricated from the porous membrane made by the method can also be a membrane contactors module, a pervaporation module, a dialysis module, an osmosis module, an electrodialysis module, a membrane electrolysis module, an electrophoresis module, or a membrane distillation module. For media filtration, the surface pore size can be about 100 to about 1,000 micrometers (μm). For microfiltration, the surface pore size can be about 0.03 to about 10 micrometers.

For ultrafiltration, the surface pore size can be about 0.002 to 0.1 micrometers. For nanofiltration, the surface pore size can be about 0.001 to about 0.002 micrometers. The porous membranes described herein are surprisingly well suited for ultrafiltration and nanofiltration. In some embodiments, the porous membrane has a surface pore size of 0.001 to 0.05 micrometers, specifically 0.005 to 0.01 micrometers.

The molecular weight cut off (MWCO) of a membrane is the lowest molecular weight solute in which 90 weight percent (wt %) or greater of the solute is retained by the membrane. The porous membranes made by the method can have a MWCO of 500 to 100,000 daltons (Da), specifically 1,000 to 50,000 Da, more specifically 2,000 to 35,000 Da, or still more specifically 3,000 to 10,000 Da. Furthermore, any of the foregoing MWCO ranges can be present in combination with a desirable permeate flux, such as clean water permeate flux (CWF). For example, the permeate flux can be 1 to 1,000 L/(h·m$^2$·bar), specifically 2 to 200 L/(h·m$^2$·bar), and more specifically 4 to 50 L/(h·m$^2$·bar), wherein L is liters and m$^2$ is square meters. The porous membranes made by the method can also provide a CWF of about 10 to about 80 L/(h·m$^2$·bar), about 20 to about 80 L/(h·m$^2$·bar), or about 40 to about 60 L/(h·m$^2$·bar).

Flux across the membrane is driven by the osmotic or absolute pressure differential across the membrane, referred to herein as the trans-membrane pressure (TMP). The trans-membrane pressure can be 1 to 2,500 kilopascals (kPa), specifically 2 to 400 kPa, and more specifically 4 to 300 kPa.

The porous membranes made by the method are useful for treatment of a variety of aqueous streams. Depending upon surface pore size distribution and pore density, and the configuration of the porous membrane, the porous membrane can be used to remove one or more of the following contaminants from water: suspended matter, particulate matter, sands, silt, clays, cysts, algae, microorganisms, bacteria, viruses, colloidal matter, synthetic and naturally occurring macromolecules, dissolved organic compounds, and salts. Thus, separation modules fabricated from the porous membranes made by the method can be used in wastewater treatment, water purification, food processing, and in the dairy, biotechnology, pharmaceutical, and healthcare industries.

The porous membranes made by the method, and separation modules fabricated from the porous membranes made by the method, can advantageously be used in medical, pharmaceutical, biotechnological, or food processes, for example the removal of salts and/or low molecular weight organic impurities from aqueous streams by ultrafiltration, which results in increased concentration of a material having a molecular weight above the cut-off of the porous membrane in an aqueous stream. The aqueous stream can be human blood, animal blood, lymph fluids, microbial or cellular suspensions, for example suspensions of bacteria, alga, plant cells, or viruses. Specific medical applications include the concentration and purification of peptides in blood plasma; hemofiltration; hemodialysis; hemodiafiltration; and renal dialysis. Other applications include enzyme recovery and desalting of proteins. Specific food applications include ultrafiltration of meat products and by-products, plant extracts, suspensions of algae or fungi, vegetable food and beverages containing particles such as pulp, and the production of milk protein concentrate for the production of cheese. Other applications include downstream processing of fermentation broths; concentration of protein in whole egg or egg white with simultaneous removal of salts and sugars; and concentration of gelling agents and thickeners, for example agar, carrageenan, pectin, or gelatin. Since a separation module fabricated from the porous membrane made by the process is useful for a wide variety of aqueous fluid separation applications in many different fields, it can be applicable to other fluid separation problems not expressly disclosed herein as well.

Separation modules fabricated from the porous membrane made by the method can be used for liver dialysis or hemodialysis; separation of polysaccharides, wherein separation comprises contacting a mixture of sugars, such as dextrose, glucose and fructose, with the porous membrane to provide a product stream enriched in a desired sugar; protein or enzyme recovery; the production of purified water, e.g., drinking water; pretreatment of water in desalination systems; removal of contaminants, including biological contaminants such as bacteria or protozoa, or organic chemical contaminants such as polychlorinated biphenyls (PCBs), to produce a purified product stream; oxygenation of blood, such as in an artificial lung device; wastewater treatment; or membrane distillation.

This disclosure is further illustrated by the following embodiments, which are not intended to limit the claims.

Embodiment 1

A porous membrane comprising, consisting essentially of, or consisting of: a poly(phenylene ether) copolymer comprising 10 to 40 mole percent repeat units derived from 2-methyl-6-phenylphenol and 60 to 90 mole percent repeat units derived from 2,6-dimethylphenol; and a block copolymer comprising backbone or pendant blocks of poly($C_{2-4}$ alkylene oxide).

Embodiment 2

The porous membrane of embodiment 1, wherein the poly(phenylene ether) copolymer has an intrinsic viscosity of 0.6 to 1.5 deciliters per gram, measured in chloroform at 25° C. and a weight average molecular weight of 75,000 to 500,000 daltons, measured by gel permeation chromatography against polystyrene standards.

Embodiment 3

The porous membrane of embodiment 1 or 2, wherein the poly($C_{2-4}$ alkylene oxide) blocks are derived from copolymerization of ethylene oxide, propylene oxide, 1,2-butylene oxide, or a combination comprising at least one of the foregoing.

Embodiment 4

The porous membrane of any of embodiments 1-3, wherein the block copolymer is a poly(ethylene oxide)-poly(propylene oxide)-poly(ethylene oxide) block copolymer, a poly(ethylene oxide)-poly(propylene oxide)-poly(ethylene oxide) block copolymer, a poly($C_{2-4}$ alkylene oxide)-poly(dimethylsiloxane) block copolymer, and a combination comprising at least one of the foregoing.

Embodiment 5

The porous membrane of any of embodiments 1-4, comprising 20 to 90 weight percent poly(phenylene ether) copolymer, and 10 to 80 weight percent of the block copolymer, based on the total weight of the porous membrane.

Embodiment 6

The porous membrane of any of embodiments 1-5, wherein the block copolymer comprises: a poly(ethylene oxide)-poly(propylene oxide)-poly(ethylene oxide) block copolymer having a number average molecular weight of 1,000 to 14,000 daltons, and comprising, based on the weight of the block copolymer, 1 to 90 weight percent, of poly(ethylene oxide) blocks; a poly(propylene oxide)-poly(ethylene oxide)-poly(propylene oxide) block copolymer having a number average molecular weight 500 to 12,000 daltons, and comprising, based on the weight of the block copolymer, 1 to 90 weight percent of poly(ethylene oxide) blocks; or a combination comprising at least one of the foregoing.

Embodiment 7

The porous membrane of any of embodiments 1-6, wherein the block copolymer comprises a poly($C_{2-4}$ alkylene oxide)-polysiloxane block copolymer comprising 5 to 60 weight percent polysiloxane, and having a number average molecular weight of 500 to 14,000 daltons.

Embodiment 8

The porous membrane of any of embodiments 1-7, wherein the block copolymer comprises a poly($C_{2-4}$ alkylene oxide)-poly(dimethylsiloxane) block copolymer of structure:

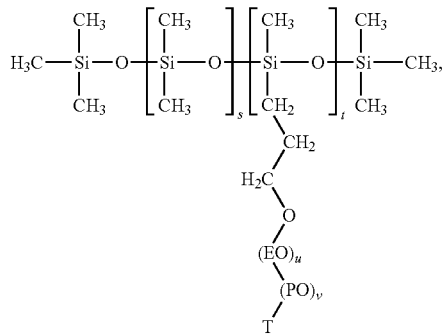

wherein: EO is —$CH_2$—$CH_2$—O—; PO is —$CH_2$—CH($CH_3$)—O—; T is hydrogen, methyl, butyl, or acetyl; s and t are each independently an integer from 1 to 50; u is an integer from 1 to 20; and v is an integer from 0 to 20.

Embodiment 9

The porous membrane of any of embodiments 1-8, having a contact angle which is 20 to 80 degrees lower than the contact angle of a porous membrane formed from the poly(phenylene ether) copolymer alone.

Embodiment 10

A method of making a porous membrane, the method comprising: dissolving a poly(phenylene ether) copolymer comprising 10 to 40 mole percent repeat units derived from 2-methyl-6-phenylphenol and 60 to 90 mole percent repeat units derived from 2,6-dimethylphenol and a block copolymer comprising backbone or pendant blocks of poly($C_{2-4}$ alkylene oxide) in a water-miscible polar aprotic solvent to form a membrane-forming composition; and phase-inverting the membrane forming-composition in a first non-solvent composition to form the porous membrane.

Embodiment 11

The method of embodiment 10, further comprising washing the porous membrane in a second non-solvent composition.

Embodiment 12

The method of embodiment 10 or 11, further comprising drying the porous membrane.

Embodiment 13

The method of any of embodiments 10-12, wherein the membrane-forming composition comprises, based on the total weight of the composition, 1 to 50 weight percent, of the hydrophobic polymer and block copolymer comprising backbone or pendant blocks of poly($C_{2-4}$alkylene oxide) combined, and 50 to 99 weight percent of the water-miscible polar aprotic solvent, and has a viscosity of 1 to 100 pascal·seconds.

Embodiment 14

The method of any of embodiments 10-13, wherein the first non-solvent composition comprises, based on the total weight of the first non-solvent composition, 10 to 100 weight percent water, and 0 to 90 weight percent N-methyl-2-pyrrolidone.

Embodiment 15

A method of making a hollow fiber by coextrusion through a spinneret comprising an annulus and a bore, wherein the method comprises coextruding: a membrane-forming composition comprising a poly(phenylene ether) copolymer comprising 10 to 40 mole percent repeat units derived from 2-methyl-6-phenylphenol and 60 to 90 mole percent repeat units derived from 2,6-dimethylphenol, and a block copolymer comprising backbone or pendant blocks of poly($C_{2-4}$ alkylene oxide) dissolved in a water-miscible polar aprotic solvent, through the annulus, and a first non-solvent composition comprising water, a water-miscible polar aprotic solvent, or a combination comprising at least one of the foregoing, in the first non-solvent composition, through the bore, into a second non-solvent composition comprising water, a water-miscible polar aprotic solvent, or a combination comprising at least one of the foregoing, to form the hollow fiber.

Embodiment 16

The method of embodiment 15, further comprising washing the hollow fiber in a third non-solvent composition.

Embodiment 17

The method of embodiment 15 or 16, further comprising drying the hollow fiber.

Embodiment 18

A hollow fiber made by the method of any of embodiments 14-17.

The invention is further illustrated by the following non-limiting examples.

Preparative Example 1: Synthesis of MPP-DMP Copolymer 2,6-Dimethylphenol (DMP) of very high purity, >99.5%, was purchased from Sigma-Aldrich. 2.-Methyl-6-phenyl-phenol (MPP) can be prepared via a modification of the established high-temperature alkylation process used to prepare DMP wherein o-phenyl phenol (OPP) is used as the starting material instead of phenol. The copolymerization was conducted in a one-gallon steel bubbling reactor, equipped with a stirrer, temperature control system, nitrogen padding, oxygen bubbling tube, and computerized control system. There were also a feeding pot and a pump for dosing reactants into the reactor. Raw materials used in the copolymerization are included in Table 2.

TABLE 2

| Materials | |
|---|---|
| Abbreviation | Chemical Name |
| DMP | 2,6-Dimethylphenol, >99.5 wt. %, available from Sigma-Aldrich. |
| MPP | 2-Methyl-6-phenylphenol |
| DBA | Di-n-butylamine |
| DBEDA | N,N'-Di-tert-butylethylenediamine |
| DMBA | N,N-Dimethylbutylamine |
| QUAT | Didecyldimethyl ammonium chloride |
| NTA | Nitrilotriacetic acid |
| CAT | Solution of $Cu_2O$ in concentrated HBr, 6.5 wt. % Cu |
| NMP | N-Methyl-2-pyrrolidone, available from ThermoFisher. |
| MPP-DMP Copolymer | Poly(2-methyl-6-phenyl-1,4-phenylene-co-2,6-dimethyl-1,4-phenylene), prepared as described herein. |
| EO | Ethylene oxide repeat unit (—$CH_2CH_2O$—) |
| PO | Propylene oxide repeat unit (—$CH_2CH(CH_3)O$—) |
| PEO | Poly(ethylene oxide) block |
| PPO | Poly(propylene oxide) block |

Reactor charges and continuous monomer feed solution composition are shown in Table 3. The target mole fraction of MPP was 0.2. After charging the reactor, the reactor contents were brought to 25° C. with stirring, and a continuous feed of monomer in toluene and then oxygen were begun. The monomer/toluene mixture was fed over 45 minutes, and oxygen feed was maintained until 130 minutes. The reactor temperature was ramped to 45° C. at 90 minutes and then ramped to 60° C. at 130 minutes. The reaction contents were then transferred to a separate vessel for addition of NTA to chelate the copper. The resulting mixture was stirred at 60° C. for 2 hours, and the layers were then allowed to separate. The decanted light phase was precipitated in methanol, filtered, reslurried in methanol, and filtered again. The MPP-DMP copolymer was obtained as a dry powder after drying in a vacuum oven under nitrogen blanket at 110° C. The MPP-DMP copolymer had an intrinsic viscosity (IV) was 1.3 deciliters per gram (dL/g), as measured in $CHCl_3$ solution at 25° C., using an Ubbelohde viscometer. The MPP-DMP copolymer also had a number average molecular weight ($M_n$) of 39,590 daltons, a weight average molecular weight ($M_w$) of 274,700 daltons, and a polydispersity of 6.9

TABLE 3

Material Amounts for Preparative Example 1

| | Example 1 |
|---|---|
| Raw Material (g) | |
| MPP/DMP (mole ratio) | 20/80 |
| CAT | 17.3 |
| DBEDA | 5.3 |
| DBA | 9.9 |
| DMBA | 34.3 |
| QUAT | 1.6 |
| DMP/TOLUENE 50/50 | 29.5 |
| TOLUENE | 2961.0 |
| MPP | 5.6 |
| Continuous Feed Solution (g) | |
| DMP/TOLUENE 50/50 | 364.5 |
| MPP | 69.4 |
| Total | 3498.36 |

Examples 1-3: Dense Films Cast from Chloroform Solution

Dense films were cast from chloroform solutions of the 20/80 poly(2-methyl-6-phenyl-1,4-phenylene ether-co-2,6-dimethyl-1,4-phenylene) copolymer of Preparative Example 1, and the poloxamers listed in Table 4, in a 4:1 weight ratio. Chloroform ($CHCl_3$) was chosen as the solvent, since it evaporates quicker than N-methyl-2-pyrrolidone (NMP). Films were cast on a glass plate using a 0.3-μm casting knife. Residual chloroform was evaporated in a nitrogen box for at least 16 hours.

The interactions between the MPP-DMP copolymer of and poloxamers were investigated by means of glass transition temperature ($T_g$) measured by differential scanning calorimetry (DSC) using a PerkinElmer DSC8000 instrument. The measurements were performed at a heating rate of 20° C. min$^{-1}$. The intrinsic hydrophilicity of the homogenous polymer films was measured by means of water contact angle. The optical contact angle measurements were performed on an OCA15 Plus from Dataphysics Instruments. The contact angle of a sessile drop of 2 μl water on the appropriate polymer film was measured six times for each coating (at room temperature), and the average and standard deviation are reported. The contact angles were measured ten seconds after the drop of water had been in contact with the surface.

TABLE 4

Polymer compositions used to prepare dense films cast from $CHCl_3$

| Ex. | Block Copolymer | Weight Ratio[a] | $T_g$ (° C.) | Film Appear. | Contact Angle[b] (°) |
|---|---|---|---|---|---|
| Comp. 1 | No block copolymer | 100/0 | 210 | Clear | 79.0 ± .5 |
| 1 | L81: PEO-PPO-PEO 10% PEO, $M_n$ ~2,800 Da | 80/20 | 186 | Cloudy | 36.3 ± 2.4 |
| 2 | 31R1: PPO-PEO-PPO 10% PEO, $M_n$ ~3,300 Da | 80/20 | 182 | Cloudy | 27.9 ± 4.1 |
| 3 | P123: PEO-PPO-PEO 30% PEO, $M_n$ ~5,800 Da | 80/20 | 195 | Cloudy | 88.1 ± 1.8[c] |

[a]Weight ratio of 20/80 MPP-DMP copolymer to block copolymer.
[b]Top surface.
[c]Contact angle of bottom surface = 14.9 ± 3.9°.

As can be seen from Table 4, the films made from a 4:1 blend of 20/80 MPP-DMP copolymer with L81 or 31R1 (Examples 1 and 2) show significant reduction in contact angle compared to the PPE only film of Comparative Example 1. Surprisingly low contact angles of around 30° C. were observed even though L81 and 31R1 have relatively low PEO content of 10 wt. %. These data suggest that the poloxamers, or at least the hydrophilic PEO blocks of the poloxamers, orient themselves to the surfaces of the dense films.

In Example 3, the film made with P123, the contact angle was dependent on the side of the membrane which was tested. On the top side which had been in contact with air the contact angle was comparable to Comparative Example 1, made without block copolymer, while on the bottom side in contact with the glass plate, a very low contact angle of 14.9° C. was observed. It is hypothesized that during the relative slow evaporation of the chloroform, phase separation of the P123 and MPP-DMP copolymer (or chloroform) occurs, and P123 migrates to the bottom side in contact with the glass. For Examples 1 and 2, the contact angles are comparable on the top and bottom sides of the films. The fact that the asymmetry in contact angles is only observed for P123 and not for the other two poloxamers suggests a correlation with the higher PEO content of P123 (30 wt. % vs. 10 wt. % in L81 and 31R1.

Fourier Transform Infrared (FTIR) spectroscopy was used to characterize the dense films and porous membranes. The analysis was done on an ALPHA FTIR spectrometer from Bruker. Spectra were collected in the wave number range of 400 cm$^{-1}$ to 4000 cm$^{-1}$ at a resolution of 4 cm$^{-1}$ for a total of 60 scans per measurement. Attenuated total reflection (ATR) mode was utilized specifically analyze the surfaces of the films. For all films containing poloxamers (Examples 1-3), a clear C—O stretch peak is observed at 1110 cm$^{-1}$ in the ATR-FTIR spectra of the film surfaces. These spectra are reproduced in FIG. 1, with Examples 2, 1, 3, and Comparative Example 1 arranged from top to bottom.

Examples 4-6: Porous Membranes Cast from NMP and Water

Porous membranes were cast from dope solutions of 14 wt. % of the 20/80 MPP-DMP copolymer of Preparative Example 1, and 3.6 wt. % poloxamer in NMP (7:5, or 1.4:1 weight ratio of MPP-DMP copolymer to poloxamer. For each dope solution the solution viscosity was measured at 20-80° C. at different shear rates with a HAAKE™ VISCOTESTER™ 550 Rotational Viscometer (Table 5) and all of the solutions showed a fairly high viscosity. There was little difference between the normal and reversed block copolymer structures of additives L81 and 31R1, and a trend to slightly higher viscosity with increased PEO content of additive P123.

Figure 2:
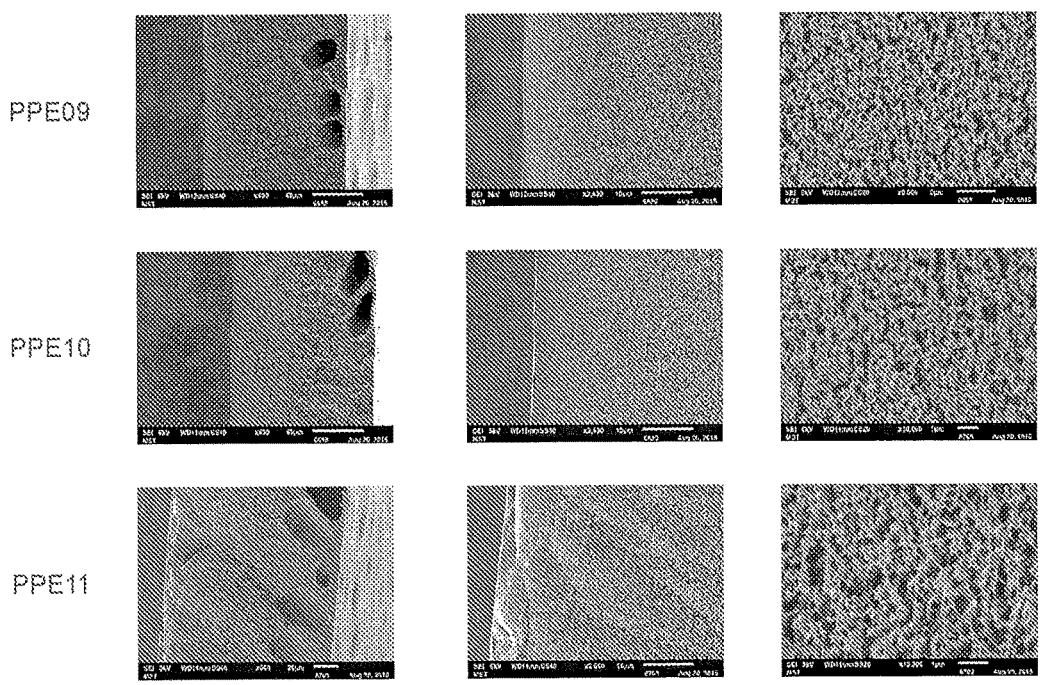
FIG. 2 depicts cross-sectional scanning electron microscopy (SEM) images of the porous membranes of Examples 8-10, composed of 20/80 MPP-DMP copolymer and poloxamers cast by phase-inversion in water.

Polymer films were cast from the dope solutions of Table 5 onto glass plates using a 0.3 µm depth casting knife. The films were subsequently submerged in a water bath at room temperature to form a flat sheet of porous membrane. The resulting porous membranes were soaked in fresh water for 8 hours to extract residual NMP solvent, and then dried in air. A JEOL JSM 6010LA Scanning Electron Microscope (SEM) was used for the initial characterization of the porous membrane morphology. The resulting SEM images are depicted in FIG. 2. As can be seen from FIG. 2, the porous membranes of Examples 4-6 all have an almost completely sponge-like structure with only a few macrovoids occurring at the bottom (glass plate) side of the porous membrane.

Figure 3:
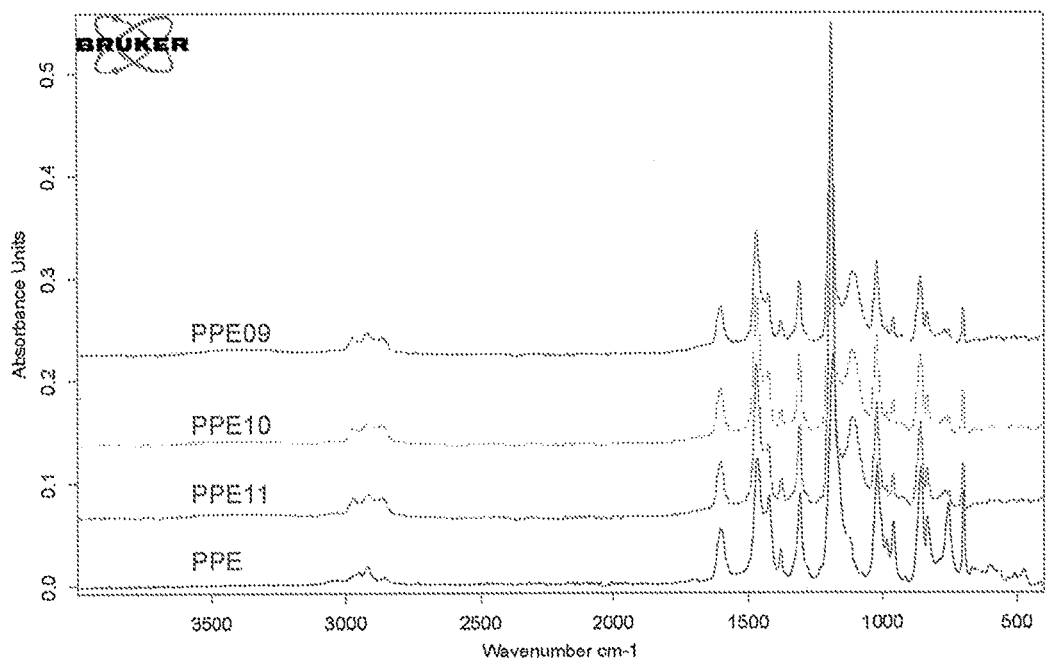
FIG. 3 depicts FTIR-ATR spectra of the porous membranes of Examples 8-10 after soaking in water for 8 hours.
Figure 4:
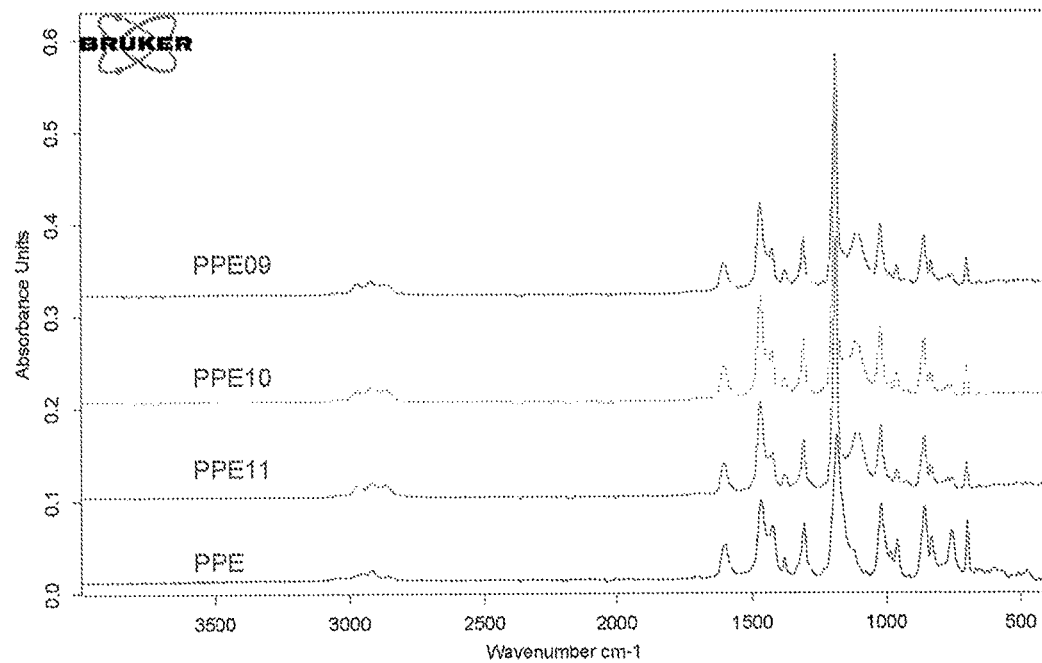
FIG. 4 depicts FTIR-ATR spectra of the porous membranes of Examples 8-10 after an additional hour of sonication in water.

As can be seen from FIG. 3, analysis of the surfaces of the porous membranes of Examples 4-6 after drying by ATR-FTIR confirmed the presence of the poloxamers due to the increases in the intensity of the absorbance peak at 1110 cm$^{-1}$ relative to the MPP-DMP copolymer. The relative intensity of this absorbance relative to the other bands of the MPP-DMP copolymer of Comparative Example 2, appear to be very similar to the relative intensities shown in FIG. 1. This indicates that very little of the poloxamer has been lost to the aqueous coagulation bath. As a further test of the permanence of the poloxamers, the porous membranes of Examples 4-6 were sonicated an additional hour in water, dried and analyzed by ATR-FTIR again. The spectra are depicted in FIG. 4. The spectra are essentially unchanged from the corresponding spectra of FIG. 3. These data indicate that little or no poloxamer was extracted from the porous membranes, even after sonication in water for 1 hour. Without being bound by theory, it is thought that the PPO blocks of the poloxamers anchor the poloxamers to the MMP-DMP copolymer surface so that they are not extracted by water and sonication.

It is anticipated that improvements in the porous membranes can be obtained by optimization of the composition and molecular weight of the MPP-DMP copolymer, alone or in combination with optimization of the PEO content and number-average molecular weight of the poloxamer. It is also anticipated that suitable co-solvents such as glycerin can be useful in modifying the viscosity and cloud point of the membrane-forming compositions, and thereby the pore structures of the resulting porous membranes.

A desirable surface property for hollow fiber membranes to be used in applications such as renal dialysis is to be self-wetting. Assembled renal dialysis cartridges are shipped in a dry, sterile state to end-users such as clinics where they must be able to be rapidly re-wet and saturate the cartridges with saline solution with little or no applied pressure prior to being exposed to blood. This requirement provides a practical definition of self-wetting. The porous membranes of Examples 4-6 (Table 5) did not exhibit self-wetting behavior when a droplet of water was placed on their surfaces, even

TABLE 5

Polymer dope solutions in NMP for porous membrane casting

| Ex. | FIG. 3, 4 ID | Poloxamer | MPP-DMP Copoly. (wt. %) | Poloxamer (wt. %) | NMP (wt. %) | Viscosity at 20° C. (Pa · s) |
|---|---|---|---|---|---|---|
| Comp. 2 | PPE | None | 14.0 | 0 | 86.0 | — |
| 4 | PPE09 | L81 | 14.0 | 3.6 | 82.4 | 10.8 |
| 5 | PPE10 | 31R1 | 14.0 | 3.6 | 82.4 | 10.9 |
| 6 | PPE11 | P123 | 14.0 | 3.6 | 82.4 | 11.7 | though the water contact angle data on dense films of the same compositions (Examples 1-3) suggested that they might be self-wetting.

Example 7: Porous Membrane with Increased Poloxamer Content

A series of porous membranes with increasing levels of P123 were prepared from the 20/80 MPP-DMP copolymer of Preparative Example 1. It was found that when the porous membrane was cast from a membrane-forming composition of 14 wt. % MPP-DMP copolymer, 10 wt. % P123, and 76 wt. % NMP (Example 7), the porous membrane spontaneously absorbed a droplet of water into the surface, and the water wicked across the surface.

Without being bound by theory, it is believed that a 1.4:1 weight ratio of MPP-DMP copolymer to P123 represents a threshold at which a sufficient amount of the PEO blocks of the poloxamer was able to migrate to the surface of the porous membrane during the rapid phase-inversion and coagulation, and so provide the desired hydrophilicity and self-wetting to the surface. This degree of hydrophilicity and self-wetting is comparable to that observed for the dense films cast from slowly-evaporating chloroform using a 4:1 weight ratio of MPP-DMP copolymer to P123 in Example 3.

Figure 5:
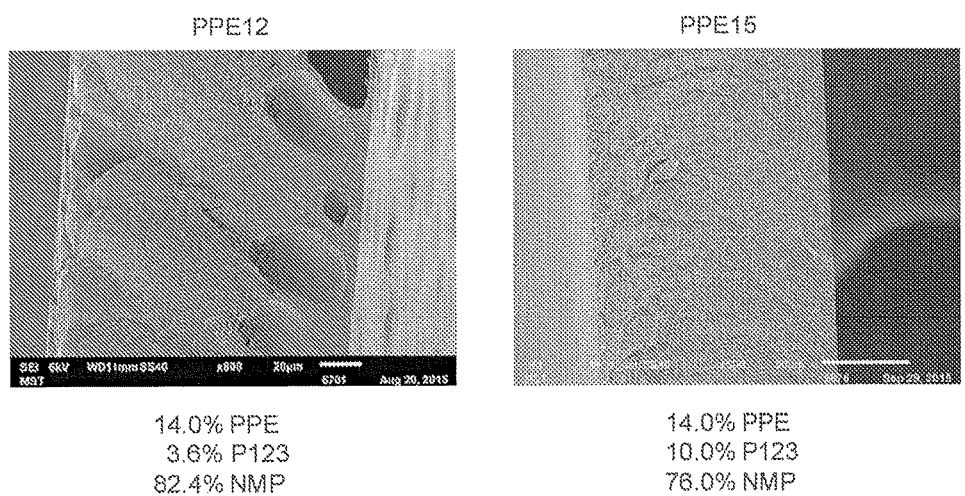
FIG. 5 depicts cross-sectional SEM images of the porous membranes of Examples 10 and 11, which illustrate the effect on membrane morphology of increasing the amount of poloxamer P123 from a 1:4 ratio of MPP-DMP copolymer to P123 to a 1:1.4 ratio of MPP-DMP copolymer to P123.

The cross-sectional morphology of the porous membranes of Examples 6 and 7 were studied by SEM. The SEM images are depicted in FIG. 5, where Example 6 is denoted "PPE12" and Example 7 is denoted "PPE15". The observed self-wetting behavior of Example 7 is associated with formation of a denser nanopore structure and little or no evidence of macrovoids in contrast to Example 6, which exhibits a less dense nanopore structure with several macrovoids. The morphology of Example 7 suggests that the porous membrane composition will be suitable for the formation of efficient hollow fiber membranes by coextrusion through an annular die. The morphology of Example 7 is also indicative of a favorable interaction between the MPP-DMP copolymer and P123.

The use of the terms "a" and "an" and "the" and similar referents in the context of describing the invention (especially in the context of the following claims) is to be construed to cover both the singular and the plural, unless otherwise indicated herein or clearly contradicted by context. "Or" means "and/or." The endpoints of all ranges directed to the same component or property are inclusive and independently combinable. Disclosure of a narrower range or more specific group in addition to a broader range is not a disclaimer of the broader range or larger group. All ranges disclosed herein are inclusive of the endpoints, and the endpoints are independently combinable with each other. The terms "first" and "second" and the like, as used herein do not denote any order, quantity, or importance, but are only used to distinguish one element from another. The term "comprises" as used herein is understood to encompass embodiments consisting essentially of, or consisting of, the named elements.

Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" refers broadly to a moiety having an open valence, comprising carbon and hydrogen, optionally with 1 to 3 heteroatoms, for example, oxygen, nitrogen, halogen, silicon, sulfur, or a combination thereof. Unless indicated otherwise, the hydrocarbyl group can be unsubstituted or substituted, provided that the substitution does not significantly adversely affect synthesis, stability, or use of the compound. The term "substituted" as used herein means that at least one hydrogen on a hydrocarbyl group is replaced with another group (substituent) that contains a heteroatom selected from nitrogen, oxygen, sulfur, halogen, silicon, or a combination thereof, provided that the normal valence of any atom is not exceeded. For example, when the substituent is oxo (i.e. "=O"), then two hydrogens on a designated atom are replaced by the oxo group. Combinations of substituents and/or variables are permissible provided that the substitutions do not significantly adversely affect the synthesis, stability or use of the compound.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A porous membrane comprising:
    a poly(phenylene ether) copolymer consisting essentially of 10 to 40 mole percent repeat units derived from 2-methyl-6-phenylphenol and 60 to 90 mole percent repeat units derived from 2,6-dimethylphenol; and
    a hydrophilic block copolymer comprising a poly(ethylene oxide)-poly(propylene oxide)-poly(ethylene oxide) block copolymer having a number average molecular weight of 1,000 to 14,000 daltons, and comprising, based on the weight of the block copolymer, 5 to 50 weight percent of poly(ethylene oxide) blocks; a poly(propylene oxide)-poly(ethylene oxide)-poly(propylene oxide) block copolymer having a number average molecular weight 500 to 12,000 daltons, and comprising, based on the weight of the block copolymer, 5 to 50 weight percent of poly(ethylene oxide) blocks; or a combination comprising at least one of the foregoing;
    wherein the weight average molecular weight of the poly(phenylene ether) copolymer is greater than or equal to 75,000 daltons and less than or equal to 500,000 daltons, measured by gel permeation chromatography against polystyrene standards.

2. The porous membrane of claim 1, wherein the poly(phenylene ether) copolymer has an intrinsic viscosity of 0.7 to 1.5 deciliters per gram, measured in chloroform at 25° C.

3. The porous membrane of claim 1, comprising 30 to 70 weight percent of the poly(phenylene ether) copolymer, and 30 to 70 weight percent of the block copolymer, based on the total weight of the porous membrane.

4. The porous membrane of claim 1, having a contact angle which is 20 to 80 degrees lower than the contact angle of a porous membrane formed from the poly(phenylene ether) copolymer alone.

5. A method of making a porous membrane, the method comprising:
    dissolving a poly(phenylene ether) copolymer consisting essentially of 10 to 40 mole percent repeat units derived from 2-methyl-6-phenylphenol and 60 to 90 mole percent repeat units derived from 2,6-dimethylphenol and a hydrophilic block copolymer comprising a poly(ethylene oxide)-poly(propylene oxide)-poly(ethylene oxide) block copolymer having a number average molecular weight of 1,000 to 14,000 daltons, and comprising, based on the weight of the block copolymer, 5 to 50 weight percent, of poly(ethylene oxide) blocks; a poly(propylene oxide)-poly(ethylene oxide)- poly(propylene oxide) block copolymer having a number average molecular weight 500 to 12,000 daltons, and comprising, based on the weight of the block copolymer, 5 to 50 weight percent of poly(ethylene oxide) blocks; or a combination comprising at least one of the foregoing in a water-miscible polar aprotic solvent to form a membrane-forming composition; and phase-inverting the membrane forming-composition in a first non-solvent composition to form the porous membrane;

wherein the weight average molecular weight of the poly(phenylene ether) copolymer is greater than or equal to 75,000 daltons and less than or equal to 500,000 daltons, measured by gel permeation chromatography against polystyrene standards.

6. The method of claim 5, further comprising washing the porous membrane in a second non-solvent composition.

7. The method of claim 5, further comprising drying the porous membrane.

8. The method of claim 5, wherein the membrane-forming composition comprises, based on the total weight of the composition, 1 to 50 weight percent, of the poly(phenylene ether) copolymer and block copolymer comprising blocks of poly($C_{2-4}$ alkylene oxide) combined, and 50 to 99 weight percent of the water-miscible polar aprotic solvent, and has a viscosity of 1 to 100 pascal-seconds.

9. The method of claim 5, wherein the first non-solvent composition comprises, based on the total weight of the first non-solvent composition, 10 to 100 weight percent water, and 0 to 90 weight percent N-methyl-2-pyrrolidone.

10. A method of making a hollow fiber by coextrusion through a spinneret comprising an annulus and a bore, wherein the method comprises coextruding:

a membrane-forming composition comprising a poly(phenylene ether) copolymer consisting essentially of 10 to 40 mole percent repeat units derived from 2-methyl-6-phenylphenol and 60 to 90 mole percent repeat units derived from 2,6-dimethylphenol, and a hydrophilic block copolymer comprising a poly(ethylene oxide)-poly(propylene oxide)-poly(ethylene oxide) block copolymer having a number average molecular weight of 1,000 to 14,000 daltons, and comprising, based on the weight of the block copolymer, 5 to 50 weight percent, of poly(ethylene oxide) blocks; a poly(propylene oxide)-poly(ethylene oxide)-poly(propylene oxide) block copolymer having a number average molecular weight 500 to 12,000 daltons, and comprising, based on the weight of the block copolymer, 5 to 50 weight percent of poly(ethylene oxide) blocks; or a combination comprising at least one of the foregoing dissolved in a water-miscible polar aprotic solvent, through the annulus, and a first non-solvent composition comprising water, a water-miscible polar aprotic solvent, or a combination comprising at least one of the foregoing, in the first non-solvent composition, through the bore, into a second non-solvent composition comprising water, a water-miscible polar aprotic solvent, or a combination comprising at least one of the foregoing, to form the hollow fiber;

wherein the weight average molecular weight of the poly(phenylene ether) copolymer is greater than or equal to 75,000 daltons and less than or equal to 500,000 daltons, measured by gel permeation chromatography against polystyrene standards.

11. The method of claim 10, further comprising washing the hollow fiber in a third non-solvent composition.

12. The method of claim 10, further comprising drying the hollow fiber.

13. A hollow fiber made by the method of claim 10.

14. The porous membrane of claim 1, wherein the poly(phenylene ether) copolymer consists of 10 to 40 mole percent 2-methyl-6-phenylphenol and 60 to 90 mole percent 2,6-dimethylphenol.

15. The porous membrane of claim 1, wherein the weight average molecular weight of the poly(phenylene ether) copolymer is greater than or equal to 75,000 daltons and less than or equal to 300,000 daltons.

16. The porous membrane of claim 1, wherein the porous membrane comprises 30 to 60 weight percent of the poly (phenylene ether) copolymer, and 40 to 70 weight percent of the block copolymer, based on the total weight of the porous membrane.

17. The porous membrane of claim 1, wherein the poly (phenylene ether) copolymer consists of 10 to 30 mole percent 2-methyl-6-phenylphenol and 70 to 90 mole percent 2,6-dimethylphenol.

18. The porous membrane of claim 1, wherein the weight average molecular weight of the poly(phenylene ether) copolymer is greater than or equal to 100,000 daltons and less than or equal to 300,000 daltons.

* * * * *